May 3, 1960 C. J. STALEGO 2,935,127
APPARATUS FOR BURNING FLUID COMBUSTIBLE MIXTURES
Filed Sept. 16, 1954 2 Sheets-Sheet 1
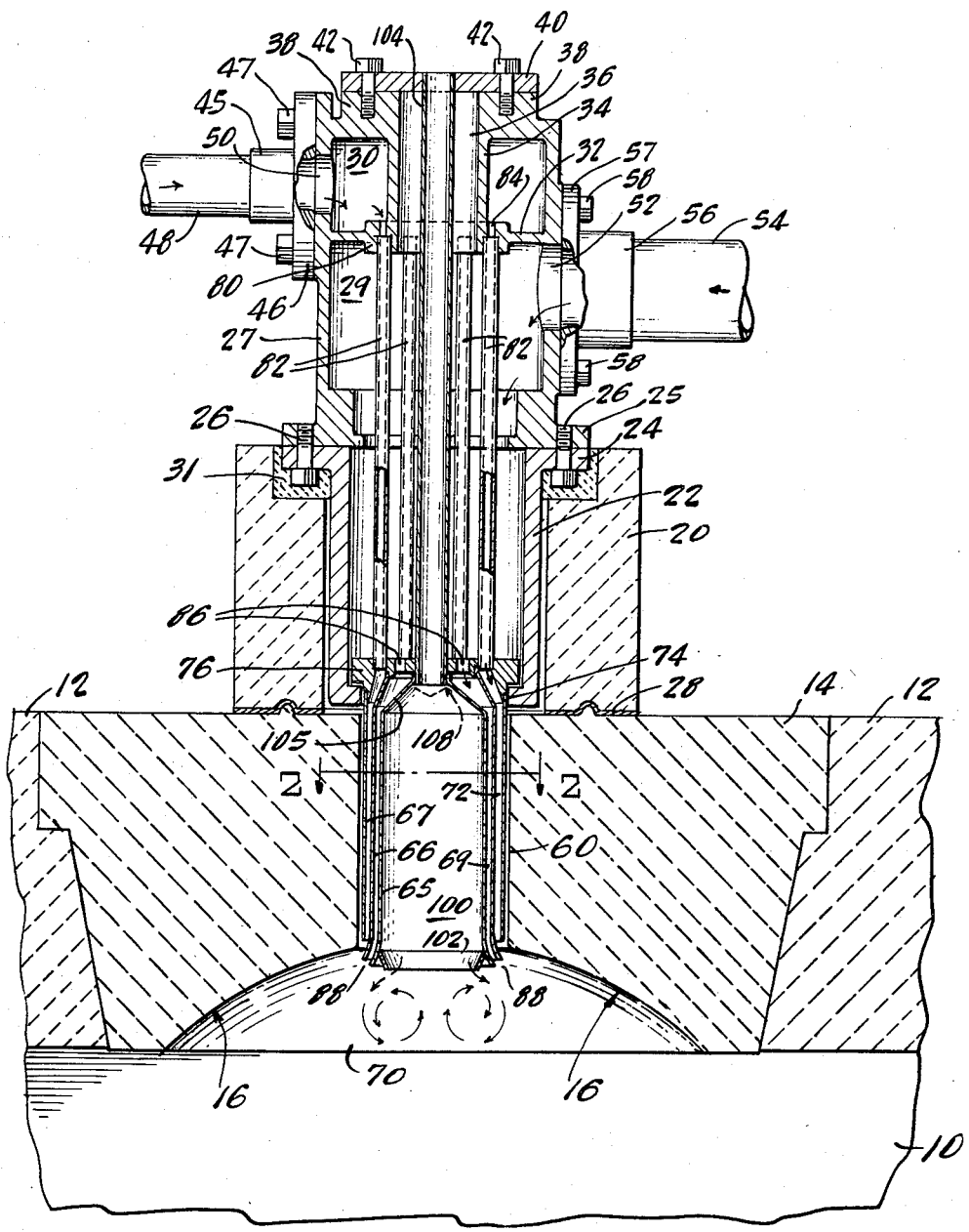
FIG-1-
INVENTOR:
CHARLES J. STALEGO.
BY
ATTYS.

May 3, 1960   C. J. STALEGO   2,935,127
APPARATUS FOR BURNING FLUID COMBUSTIBLE MIXTURES
Filed Sept. 16, 1954   2 Sheets-Sheet 2
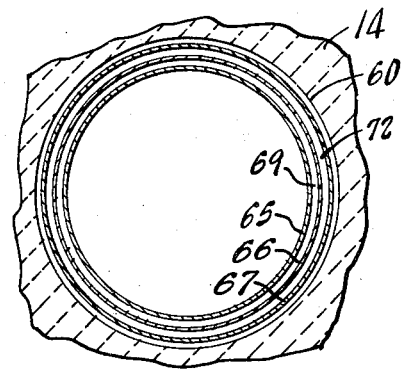
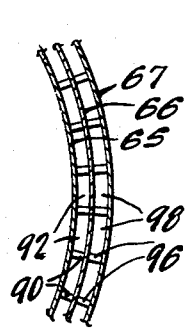
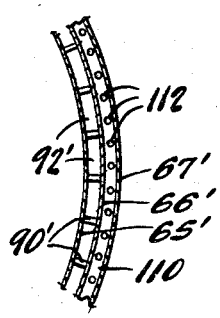
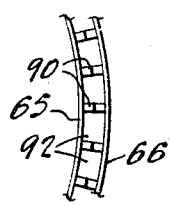
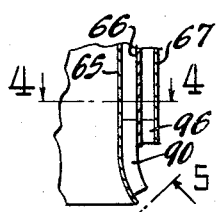
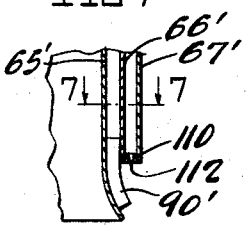
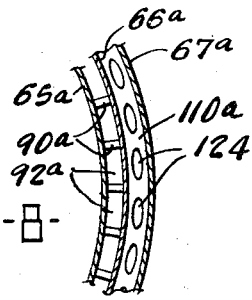
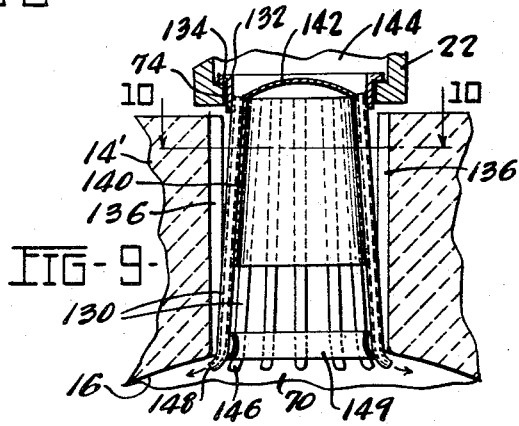
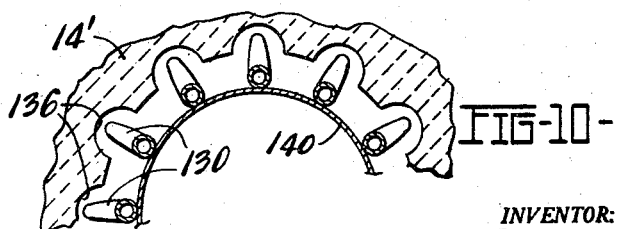
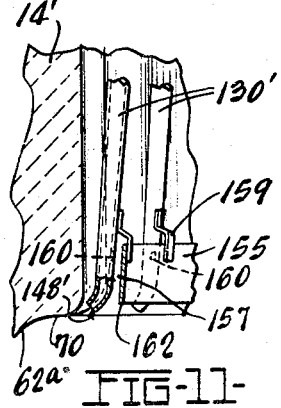
INVENTOR:
CHARLES J. STALEGO.
BY
ATTYS.

United States Patent Office 2,935,127
Patented May 3, 1960

2,935,127

APPARATUS FOR BURNING FLUID COMBUSTIBLE MIXTURES

Charles J. Stalego, Newark, Ohio, assignor to Owens-Corning Fiberglas Corporation, a corporation of Delaware Application September 16, 1954, Serial No. 456,540

1 Claim. (Cl. 158—99)

This invention relates to method and apparatus for burning combustible mixtures and more especially to burners of the radiant type and method of burning combustible mixtures especially usable in furnaces for melting materials having high fusing temperatures such as glass, slag or fusible rock and for maintaining materials of this character in molten or flowable condition.

Radiant burners have been used with furnaces or melting tanks especially for melting mineral materials and for maintaining them in molten condition, and such radiant burners as have been heretofore employed for the purpose have been fashioned or equipped with a cap, the fuel mixture being discharged from orifices above the cap in directions resulting in the burning gases moving in involute paths. In maintaining glass, slag or fusible rock at high temperatures in molten condition, volatiles from the molten glass or other material are given off and, under certain conditions, are deposited upon adjacent surfaces of the burner construction. For example, such volatiles from the glass or other molten material are entrained in the moving, burning gases or products of combustion and are deposited upon the burner cap, resulting in deterioration, disintegration or washing away of the cap. Fluxes, such as boric oxide and other metal oxides, contained in the deposit of volatiles on the refractory burner cap cause the refractory to disintegrate or wash away very rapidly, necessitating shutting down the furnace or tank in order to replace and rebuild the damaged burner.

In prior constructions of radiant burner, the fuel-and-air mixture has been delivered into a combustion zone through substantially horizontal, radially spaced tubular passages formed in a cap member, burning of the mixture ensuing in a manner wherein the products of combustion move in a path of involution of a character and under conditions fostering continuous deposition of the glass volatiles on the cap; and within a comparatively short time the refractory cap is washed away. Burners of the character used heretofore have comparatively short life, necessitating frequent shut-downs in order to repair or replace the burner constructions. As a furnace or tank normally is maintained at very high temperatures of 2800° F., or more, an extended period of time is required for a furnace or tank to become cooled so that repairs or replacements can be effected.

The present invention embraces the provision of a radiant burner construction of a character wherein the fuel-and-air mixture is delivered into a combustion zone in a manner wherein disintegration and deterioration of the burner construction are substantially eliminated or reduced to a minimum.

An object of the invention embraces a method of delivering fuel and air into a combustion zone in a receptacle containing molten glass or other mineral material in a manner wherein a high combustion efficiency is attained and the movements of burning gases and products of combustion in the combustion zone are controlled and directed in paths substantially eliminating the deposition of volatiles given off by the molten glass or other mineral material upon surfaces defining the combustion zone and upon components of the fuel and air delivery means.

An object of the invention is the provision of a radiant-type burner construction wherein fuel and air are delivered into a combustion zone in an annular pattern whereby the necessity of a burner cap is avoided.

Another object of the invention is the provision of a radiant-type burner construction, especially for use in heating glass or other mineral material, wherein fuel and air are delivered into a combustion chamber in an annular zone in conjunction with means for modifying or obstructing to a substantial degree a path of involution of products of combustion whereby combustion efficiency is improved and deposition of volatiles from the molten glass or mineral material upon the burner is substantially eliminated.

Another object of the invention is the provision of a combustion apparatus wherein the fuel and air are introduced into a combustion zone through concentric cylinders in such a manner that the burning gases and products of combustion are initially projected along the surface of the combustion zone and an involutional path of travel of the gases is modified to secure improved combustion with a minimum of wear or disintegration of the refractory surfaces of the combustion zone and components of the combustion apparatus.

Another object of the invention is the provision of a radiant burner construction wherein fuel and air are delivered in an annular pattern into a generally spherically shaped combustion zone or chamber and wherein the burner may be provided with valve means to control independent flow of air to the combustion zone whereby the burner construction may be used effectively for heating mineral materials in tanks or furnaces which may be maintained under either negative or positive pressure, the arrangement facilitating the control of paths of involution of the products of combustion.

Another object is the provision of combustion apparatus embodying deflectors or vanes for controlling movement of burning gases and products of combustion whereby improved combustion efficiency is obtained.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

Figure 1 is a vertical sectional view through a portion of a melting tank or furnace for high-temperature fusing materials illustrating a form of burner construction of the invention;

Figure 2 is a transverse sectional view taken substantially on the line 2—2 of Figure 1;

Figure 3 is a fragmentary sectional view showing a modified form of mixture delivery means for a burner of the type shown in Figure 1;

Figure 4 is a fragmentary sectional view taken substantially on the line 4—4 of Figure 3;

Figure 5 is a fragmentary view taken in the direction of the line 5—5 of Figure 3;

Figure 6 is a view similar to Figure 3, illustrating a modified form of the end zone of the burner;

Figure 7 is a fragmentary sectional view taken substantially on the line 7—7 of Figure 6;

Figure 8 is a view similar to Figure 7 showing a modified form of end zone of the burner;

Figure 9 is a vertical sectional view illustrating a modified form of burner construction of the invention;

Figure 10 is a horizontal sectional view taken substantially on the line 10—10 of Figure 9, and Figure 11 is a fragmentary sectional view illustrating a modified form of the construction shown in Figure 9.

While the forms of burner construction illustrated in the drawings and the method of combustion are particularly adapted for use in heating furnaces utilized for melting glass batch, slag, and fusible rock, or for maintaining such mineral materials in molten condition in a tank, forehearth or other receptacle, it is to be understood that the method and apparatus of the invention may be utilized for heating other materials or wherever radiant heaters and radiant heating may be utilized to advantage.

Referring to the drawings in detail, there is illustrated in Figure 1 a form of radiant-type burner of the invention arranged in the roof or upper wall of a furnace, tank, receptacle or forehearth adapted to contain molten glass, slag or fusible rock in molten condition, wherein the radiant heat from one or more of such burners serves to maintain material in molten condition or to reduce glass batch or solid material to a molten state. There is shown in Figure 1 a portion of a tank or receptacle 10 having a roof or upper wall formed of members or blocks 12 of refractory material.

Assembled with members 12 is a roof or upper wall section 14 formed of suitable high-temperature refractory and provided with a curved, cup-like or spherically shaped surface 16 which is disposed above the molten material in the tank or furnace 10. The curvature or configuration of the surface 16 is such as to obtain a high efficiency of reflection and radiation of heat from the intensely hot refractory adjacent the burner or burners. The section or block 14 is preferably of square contour to facilitate assembly with the refractory blocks 12.

Disposed above the member or roof section 14 is a tile or block 20 of heat-resistant material and hollow configuration adapted to receive and accommodate a burner-supporting member, holder or sleeve 22 formed of metal and of generally cylindrical shape. The upper end of sleeve 22 is formed with a flange portion 24 which mates with a flange portion 25 of a member 27, the member 27 being shaped to provide an air chamber 29 and a fuel chamber 30. The flanges 24 and 25 are secured together by means of bolts 26. A layer 28 of high-temperature-resistant cement secures the tile 20 to the member 14, and a removable packing or sealing material 31 is disposed between the upper portions of the tile 20 and metal sleeve 22.

The fuel chamber 30 is separated from the air chamber 29 by a partition 32. The chamber 30 is of annular shape, the inner wall 34 of the chamber 30 providing a space or chamber 36 which is in communication with the air chamber 29. The upper zone of member 27 is provided with a boss portion 38 which accommodates a cover plate or closure 40 held in place by means of bolts 42.

Secured to a wall of member 27 above the partition 32 is a fitting 45 having a flange 46 secured to member 27 by means of bolts 47. A pipe or tube 48 is connected with the fitting 45 and is adapted to convey fuel gas from a supply (not shown) to the chamber 30 through an opening 50 in the chamber wall in registration with the tube 48.

The wall of chamber 29 below the partition 32 is formed with an opening 52 which is in registration with a tube or pipe 54 for conveying air from a supply of air under pressure into the chamber 29. The tube 54 is connected to member 27 by means of a fitting 56 formed with a flange 57 secured to member 27 by means of bolts 58. In the arrangement shown in Figure 1, the partition 32 in member 27 serves to separate the air in chamber 29 from the fuel in chamber 30. The tubes or pipes 48 and 54 may be provided with control valves (not shown) for regulating the fuel gas and air supplied to the burner.

The member 14 above the material-containing tank or receptacle is formed with a cylindrical space or chamber defined by a cylindrical wall 60 which accommodates the burner construction. The roof member 41 may be formed with a spherically shaped surface defining a cup-like recess above the material in the tank 10.

Disposed in the passage defined by wall 60 is a burner tip construction which includes concentrically arranged, cylindrical members or sleeves 65, 66 and 67. As shown in Figures 1 and 2, the walls 65 and 66 define an annular passage 69 for conveying compressed air from chamber 29 into the combustion zone 70 formed by the cup-like recess defined by the curved wall 16 in member 14. The cylindrical members 66 and 67 define an annular passage 72 for conveying fuel gas from chamber 30 into the combustion zone 70. The passage defined by wall 60 is slightly larger in diameter than the sleeve 67 to accommodate expansion of the burner sleeve at high temperatures.

The sleeve-like member 22 is provided at its lower extremity with an inwardly extending flange 74. Disposed in the interior of the sleeve 22 and supported by said flange is a member 76 providing a supporting means for the members or sleeves 65, 66 and 67. The members 65, 66 and 67 may be formed of sheet metal or the like, capable of withstanding high temperatures, the sleeves being welded or otherwise secured to and supported by member 76.

The partition 32 is formed with a thickened portion 80 formed with a plurality of cylindrical openings adapted to receive the upper end zones of tubes 82 as shown in Figure 1. As shown in Figure 1, the tubes 82 do not extend through the thickened portion 80, but the portion 80 is formed with openings or passages 84 in registration with tubes 82, providing for the flow of fuel gas from chamber 30 into the tubes 82.

The member 76 is formed with a plurality of cylindrical openings or recesses to accommodate the lower end zones of tubes 82 whereby fuel gas is delivered through tubes 82 into the annular passage or chamber 72 for discharge or delivery into the combustion zone 70. The annular member 76 is also provided with a plurality of openings 86 to provide for flow of air under pressure from chamber 29 through the interior of sleeve 22 into the annular passage 69 for discharge into the combustion zone 70. Through the use of separate air and fuel chambers 29 and 30, tubes 82 and annular, sleeve-like members 65, 66 and 67, the fuel gas and air are discharged or delivered in contiguous streams into the zone 70 wherein combustion takes place. As shown in Figure 1, the lower end zones of the sleeves or walls 65 and 66 are flared outwardly, as indicated at 88, to direct the air in an annular and radially projected path generally coincident with the surface 16 of the combustion zone 70 and is mixed with the fuel gas stream, providing a combustible mixture adjacent to and in contact with surface 16.

Ignition of the mixture is initiated at the discharge zones 88 adjacent the extremities of the sleeves, and the mixture burns as it travels along the curved surface 16 of the member 14. By reason of the pressure of the gases entering the combustion zone along the surface 16 and the expansion of the burning gases, some of the burning gases and products of combustion move toward the central axis of the burner in involute paths as indicated by the arrows in Figure 1. As hereinafter described, the apparatus is inclusive of a method and means of modifying or changing the involute paths of traverse of the burning and burned gases to avoid or minimize the deposition of volatiles from the molten material upon the burner surfaces and improve combustion efficiency.

The burner construction illustrated in Figure 1 may be provided with means disposed adjacent the discharge or delivery zones of the annular chambers 69 and 72 to facilitate discharge or delivery of air and fuel gas into the combustion zone 70 in a plurality of jets or streams. One form of apparatus for accomplishing this purpose is illustrated in detail in Figures 3, 4 and 5. Disposed between walls 65 and 66 adajacent the lower ends thereof and circumferentially spaced in the air passage 69 is a plurality of radially arranged partitions 90 forming a plurality of discharge openings or orifices 92 of substantially rectangular configuration through which air under pressure is delivered into the combustion zone 70 in a plurality of streams arranged in an annular path and directed radially of the axis of the burner by reason of the curved zones 88 fashioned at the lower ends of sleeves 65 and 66.

Disposed between walls 66 and 67 is a plurality of circumferentially spaced, radially arranged partitions 96 forming with the walls small passages or orifices 98 through which fuel gas in the annular passage 72 is delivered or discharged into the combustion zone 70 at the juncture of the cylindrical wall 60 with the spherically shaped wall 16 of the combustion zone and into the air streams discharged through orifices 92 hereinbefore described. Ignition and combustion of the fuel-and-air mixture takes place adjacent the discharge zones provided by orifices 92 and 98.

Due to the pressure of the incoming fuel and air streams, a lower pressure exists adjacent the central axis of combustion zone 70, and the pressure differential causes some of the burning gases and products of combustion to travel in a path of involution, indicated by the arrows in Figure 1, at the central area of the combustion done 70. When the burner arrangement of the invention is utilized for melting glass or maintaining glass in a molten state, volatiles or gases are given off by or emanate from the body of glass which become mixed with the burning gases in the zone 70 and, to a major degree, are entrained or carried by the burning gases and products of combustion in involute paths in the combustion zone 70.

It has been found that combustion and flame propagation in the combustible mixture in zone 70 are improved through the use of an abutment, deflector or vane to interrupt or modify the otherwise normal path of involution of the burning gases in the combustion zone and that the abutment or similar means eliminates or greatly minimizes the tendency for the glass volatiles to be deposited upon the lower zones or surfaces of the burner components. One form of vane or deflector 102 is illustrated in Figure 1. The vane 102 is of annular shape and is secured to the inner wall of sleeve 65 and projects generally downwardly and toward the vertical axis of combustion zone 70.

The vane 102 may be projected downwardly at different distances, depending on the amount of change or modification desired in the path of involution of the burning gases and products of combustion, and its zone of termination if substantially aligned with or just below the end of sleeve 65 serves to satisfactorily interrupt or modify the involutional path of the gases for the purposes mentioned. The vane 102 tends to obstruct the normal flow of the boundary layers of products of combustion and burning gases moving in an otherwise involute path so that an increase in pressure is established adjacent the vane 102 which tends to reduce the speed of involution of the gases and further minimize the tendency of the glass volatiles to be deposited on the sleeve 65 of the burner construction.

Figures 6 and 7 illustrate a modified form of the air and fuel discharge orifice construction at the tip of the burner construction. Disposed between the walls 65' and wall 66' is a plurality of radially arranged, circumferentially spaced vanes or partitions 90' providing rectangularly shaped air discharge orifices 92'. Disposed between the walls 66' and 67' at the lower ends thereof is an annular member or plate 110 provided with a plurality of spaced circular openings 112 forming orifices through which fuel from chamber 72 is discharged into the combustion zone 70. The openings 112 in the member or strip 110 provide for a large number of streams or jets of fuel gas directed into the streams of air discharged through the passages 92' forming a substantially homogeneous fuel-and-air mixture adapted to be burned in the zone 70. The discharge of air and fuel into a common zone through a plurality of spaced orifices provides a satisfactory and uniform mixing of the fuel gas and air, enhancing the efficiency of combustion.

The combustion of the fuel-and-air mixture takes place along the spherically shaped surface 16, and the said surface becomes intensely hot and reflects and radiates heat onto the material in the tank or furnace 10. The roof or upper wall of the melting tank or receptacle 10 may be provided with one or more vents or comparatively small passages (not shown) for the escape or exhaust of products of combustion from the zone 70. In installations where the tank or furnace is maintained under a pressure above atmospheric pressure, the tank or furnace may be vented through the central zone of the burner. As shown in Figure 1, a tube 104 may be joined with a cone-shaped portion 105 of the innermost sleeve or wall 65, providing a vent to the atmosphere through which products of combustion may be discharged from the zone 70. By venting the chamber or zone 70 through the central axis of the burner construction, the movement of burned gases upwardly through the chamber 100 into the vent tube 104 causes further interruption of the path of involution of the burning gases and products of combustion.

If the tank or furnace 10 is maintained under a subatmospheric pressure, a valve means 108, shown in broken lines in Figure 1, may be employed, the position of which may be regulated or controlled by means (not shown) extending exteriorly of the burner construction for determining the rate of admission of air from the atmosphere through the tube 104 into the chamber 100 and the combustion zone 70. The position of the valve 108 may be adjusted to control the admission of air to the combustion zone, and the air flow into this zone is effective to further modify or change the path of involution of the burning gases and products of combustion.

Figure 8 illustrates a modified form of orifice construction for the discharge or delivery of fuel gas and air from the burner. The arrangement shown in this figure is similar to that illustrated in Figure 7. Radially arranged partitions 90a are disposed between walls 65a and 66a, forming rectangularly shaped air discharge orifices 92a. The band or strip 110a disposed between walls 66a and 67a is formed with elongated or oval-shaped openings 124 through which fuel gas is discharged to be admixed with the air from the orifices 92a in the combustion zone adjacent the burner.

Figures 9 and 10 are illustrative of a modified form of burner construction wherein gaseous fuel and air mixture is conveyed through a plurality of metal tubes into the combustion zone 70. Disposed in a central opening or chamber formed in the roof member 14' of the tank or furnace 10 is a plurality of tubes 130 arranged in an annular pattern. A fitting or member 132 disposed within the sleeve 22 is formed with a laterally projecting flange portion 134 engageable with the inwardly extending flange 74 on the sleeve or fitting 22, the fitting 132 supporting the assembly of mixture conveying tubes 130. The fitting 132 is provided with a plurality of openings arranged in a circular formation adapted to receive the upper end zones of the tubes 130, the latter being welded or otherwise secured to the fitting 132.

The walls of member 14' are provided with a series of flutes or semicylindrical recesses 136, a flute or recess being provided to accommodate each of tubes 130, providing an arrangement whereby the hot products of combustion from the zone 70 may surround the mixture conveying tubes 130 for preheating the mixture prior to its delivery into the combustion zone 70. Fitted within the space defined by the tubes 130 is a frusto-conically shaped sleeve or member 140 provided with a curved or arched wall 142 at its upper end zone which closes the end of the sleeve 140 and forms the lower wall of a gas and air mixing chamber 144 defined by the sleeve 22.

The tips or lower end zones of the tubes 130 are bent or turned outwardly or radially of the vertical axis of the burner as shown at 146 in Figure 10. The chamber 144 is supplied with fuel gas and air under pressure from suitable sources of supply, providing a gas-and-air mixture within the chamber 144, the mixture being conveyed downwardly by the tubes 130 and discharged or delivered through the orifices 148 in the outwardly extending extremities 146 of the tubes 130.

An annular deflector or vane 149, formed of high-temperature-resistant metal alloy or other suitable material capable of withstanding the intense heat existent in the combustion zone 70, is disposed within the assembly of tubes as shown in Figure 9. The deflector 149 may be shaped in the manner shown in Figure 9, having its interior wall portion extending toward the vertical axis of the burner, providing an impediment or means arranged to change or modify the normal path of involution of the burning gases and products of combustion in the zone 70 and increase efficiency of combustion.

The fuel-and-air mixtures discharged from the orifices 148 at the extremities of tubes 130 are ignited and combustion takes place along the curved surface 16, a portion of the burning mixture moving in the path of involution as indicated by the arrows in Figure 9. By interrupting or modifying the normal path of involution, efficiency of combustion and flame propagation in the central area of the zone 70 is improved; and by reason of the delivery of fuel-and-air mixtures in an annular pattern within the cup-like recess or combustion zone 70, burning of the mixture takes place throughout substantially the entire area of the combustion zone 70 whereby the fuel is more completely burned than has been heretofore possible with other types of radiant burners.

The semicylindrical recesses 136, formed in the roof member or block 14' adjacent burner tubes 130, provide zones occupied by the hot products of combustion whereby the latter, being in contact with the mixture-conveying tubes 130 throughout substantially their entire length, preheat the mixture in the tubes, thereby fostering an increased rate of flame propagation. As the lower extremities of the tubes 130 and the vane or deflector 149 are at comparatively high temperatures, there will be little tendency for the deposition of glass volatiles upon these elements of the burner construction.

Figure 11 illustrates a modified form of vane construction for use with the arrangement shown in Figures 9 and 10. In this form, a vane 155 in the form of an annulus is disposed adjacent the lower extremities of the mixture-conveying tubes 130'. The vane 155 is spaced from the tubes 130' to provide an annular passage 157 between the tubes and the vane 155. The vane 155 may be supported by means of circumferentially spaced fingers 159 welded or otherwise secured to the tubes 130'.

Each of the tubes 130' has a discharge orifice 148' contiguous to the wall 62' of the refractory block 14' whereby the mixture being ignited at its point of discharge from the orifices 148 flows along the surface 62' before substantial movement of involution of the gases takes place as hereinbefore described. The vane 155 interrupts or modifies the normal path of involution of the gases to minimize deposition of volatiles upon the mixture-conveying tubes.

A wall of each of the tubes 130' may be formed with a supplemental orifice or bleed opening 160 adjacent the vane 155 as shown in Figure 11. The lower edge 162 of the vane terminates adjacent but above the mixture discharge orifice or zone of each of the tubes 130'. Through this arrangement a minor portion of the mixture being conveyed to the combustion zone through tubes 130' flows or is delievered through the auxiliary orifices or bleed openings 160 into the passage or space 157, thence downwardly into the combustion zone 70.

In the downward flow of the mixture in the annular space or chamber 157, the gases contact the zones of the tubes adjacent the vane 155 and serve to wipe off any deposit of volatiles on the tube portions adjacent the vane 155. Thus, the incoming, unburned mixture moving through passage 157 is free of glass volatiles and provides an intermediary layer of gases between the lower walls of tubes 130' and the products of combustion moving in generally involute paths in which glass volatiles may be entrained. Thus, in this form of the invention the vane 155 serves to modify the path of movement of the burning gases and to minimize or eradicate deposits of volatiles on the burner construction.

The use of the apparatus of the several forms of the invention involves a novel method of burning a combustible mixture in a zone above or adjacent material to be maintained at high temperatures. Through the arrangement of delivering or discharging gaseous fuel and air or other oxidant for supporting combustion into a combustion zone in an annular discharge area or pattern, combustion takes place at a high efficiency not only along the curved surface or surfaces of the cup-shaped recess defining the zone 70 but also through the gases moving toward the vertical axis of the combustion zone. Through the step of modifying or changing the normal path of involution of gases moving toward the central axis of the combustion zone, the tendency for glass volatiles, or volatiles from other material being heated by the burner or a series of burners, to be deposited on the components or elements of the burner constructions is greatly minimized or substantially eliminated.

When the fuel gas and air are separately conveyed to the combustion zone, the fuel gas may be under pressure upwards of 30 pounds per square inch and the air may be under pressures exceeding 30 pounds per square inch, if desired. In utilizing the burner constructions with premixed fuel gas and air, the pressures should be relatively low. For example, it is preferable that the fuel gas be delivered to a premixing chamber or zone 144 at pressures from 10 to 15 pounds per square inch and air pressures of from 1 to 7 pounds per square inch.

It is apparent that, within the scope of the invention, modifications and different arrangements may be made other than is herein disclosed, and the present disclosure is merely illustrative.

I claim:

A radiant burner construction in combination with a member of refractory having a spherically-shaped surface defining a combustion zone, said member having a cylindrically-shaped opening radially arranged with respect to the spherically-shaped surface, a burner including concentrically arranged metal sleeves disposed in said opening and in spaced relation forming an annular fuel passage and an annular air passage, said sleeves terminating adjacent the spherically-shaped surface of the combustion zone, the terminal regions of the sleeves being flared outwardly for directing the fuel and air along the spherically-shaped surface of the combustion zone, the innermost of said sleeves extending substantially the length of the opening in said member of refractory and forming a cylindrically-shaped chamber opening into the combustion zone, an annular metal baffle arranged at the entrance of the cylindrically-shaped chamber secured to the innermost sleeve and tapering inwardly toward the combustion zone, a second member of refractory mounted upon said first member, a manifold construction mounted upon said first member formed with a first and second manifold chambers, said first manifold chamber adapted to contain fuel under pressure, said second manifold adapted to contain air under pressure, a first duct means arranged to conduct fuel from said first manifold chamber to the annular fuel conveying passage, a second duct means arranged to conduct air under pressure from said second manifold chamber to said annular air conveying passage, and vent means including a tubular element extending through said manifold construction and being in communication with the cylindrically-shaped chamber for venting the same to the atmosphere.

References Cited in the file of this patent

UNITED STATES PATENTS

| | | |
|---|---|---|
| 792,642 | Williams | June 20, 1905 |
| 1,956,857 | Cunningham | May 1, 1934 |
| 1,981,349 | Dodge | Nov. 20, 1934 |
| 2,215,079 | Hess | Sept. 17, 1940 |
| 2,375,119 | LeTourneau | May 1, 1945 |
| 2,474,313 | Hess | June 28, 1949 |

FOREIGN PATENTS

| | | |
|---|---|---|
| 564,754 | Germany | Nov. 22, 1932 |